US009288338B2

(12) United States Patent
Arinobu

(10) Patent No.: US 9,288,338 B2
(45) Date of Patent: Mar. 15, 2016

(54) IMAGE FORMING SYSTEM AND IMAGE FORMING APPARATUS THAT MAKE MISCELLANEOUS AFFAIRS ABOUT USE OF IMAGE FORMING APPARATUS SETTLE APPROPRIATELY

(71) Applicant: KYOCERA Document Solutions Inc., Osaka (JP)

(72) Inventor: Ryota Arinobu, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/683,750

(22) Filed: Apr. 10, 2015

(65) Prior Publication Data

US 2015/0296090 A1 Oct. 15, 2015

(30) Foreign Application Priority Data

Apr. 10, 2014 (JP) .................................. 2014-080975

(51) Int. Cl.
*H04N 1/00* (2006.01)
*G06F 3/00* (2006.01)
*G06F 3/12* (2006.01)

(52) U.S. Cl.
CPC ............ *H04N 1/00079* (2013.01); *G06F 3/121* (2013.01); *G06F 3/1235* (2013.01); *G06F 3/1285* (2013.01); *H04N 1/0005* (2013.01); *H04N 2201/0094* (2013.01)

(58) Field of Classification Search
USPC ........................................................ 358/1.14
See application file for complete search history.

(56) References Cited

U.S. PATENT DOCUMENTS

2005/0134893 A1* 6/2005 Han .......................... G06F 3/121
358/1.14
2013/0036333 A1* 2/2013 Lee ..................... G06F 11/0733
714/57

FOREIGN PATENT DOCUMENTS

JP 2003-091405 A 3/2003

OTHER PUBLICATIONS

Watable Tasuya, Image processor and Image Processing System, Mar. 28, 2003, Machine Translated Japanese Patent Application Publication, JP2003091405, All pages.*

* cited by examiner

*Primary Examiner* — Ngon Nguyen
(74) *Attorney, Agent, or Firm* — Hawaii Patent Services; Nathaniel K. Fedde; Kenton N. Fedde

(57) ABSTRACT

Provided is an image forming system that makes operations to various miscellaneous affairs complete appropriately and certainly. Various miscellaneous affairs are settled by the miscellaneous-affairs information screen, which is a miscellaneous-affairs demand request circuit, in MFP, which is an image forming apparatus. The miscellaneous-affairs supporter list is stored in the memory, which is a memory circuit. If the request to another person is needed, a miscellaneous-affairs demand request is performed to a client terminal of a person chosen from the miscellaneous-affairs supporter list. In the case, the response to a miscellaneous-affairs demand request is obtained from the miscellaneous-affairs demand response screen, which is a miscellaneous-affairs demand response circuit of the client terminal.

7 Claims, 4 Drawing Sheets

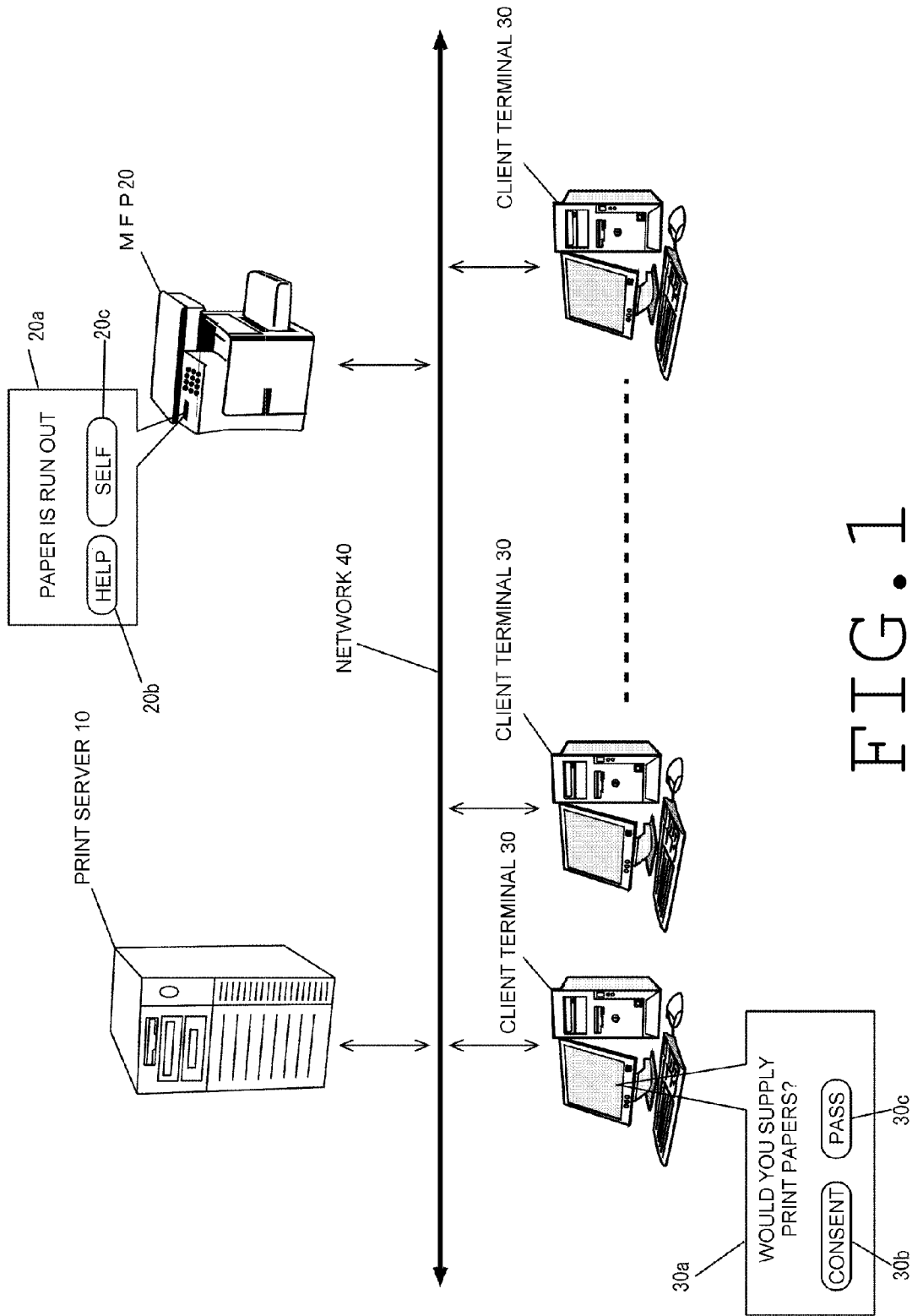

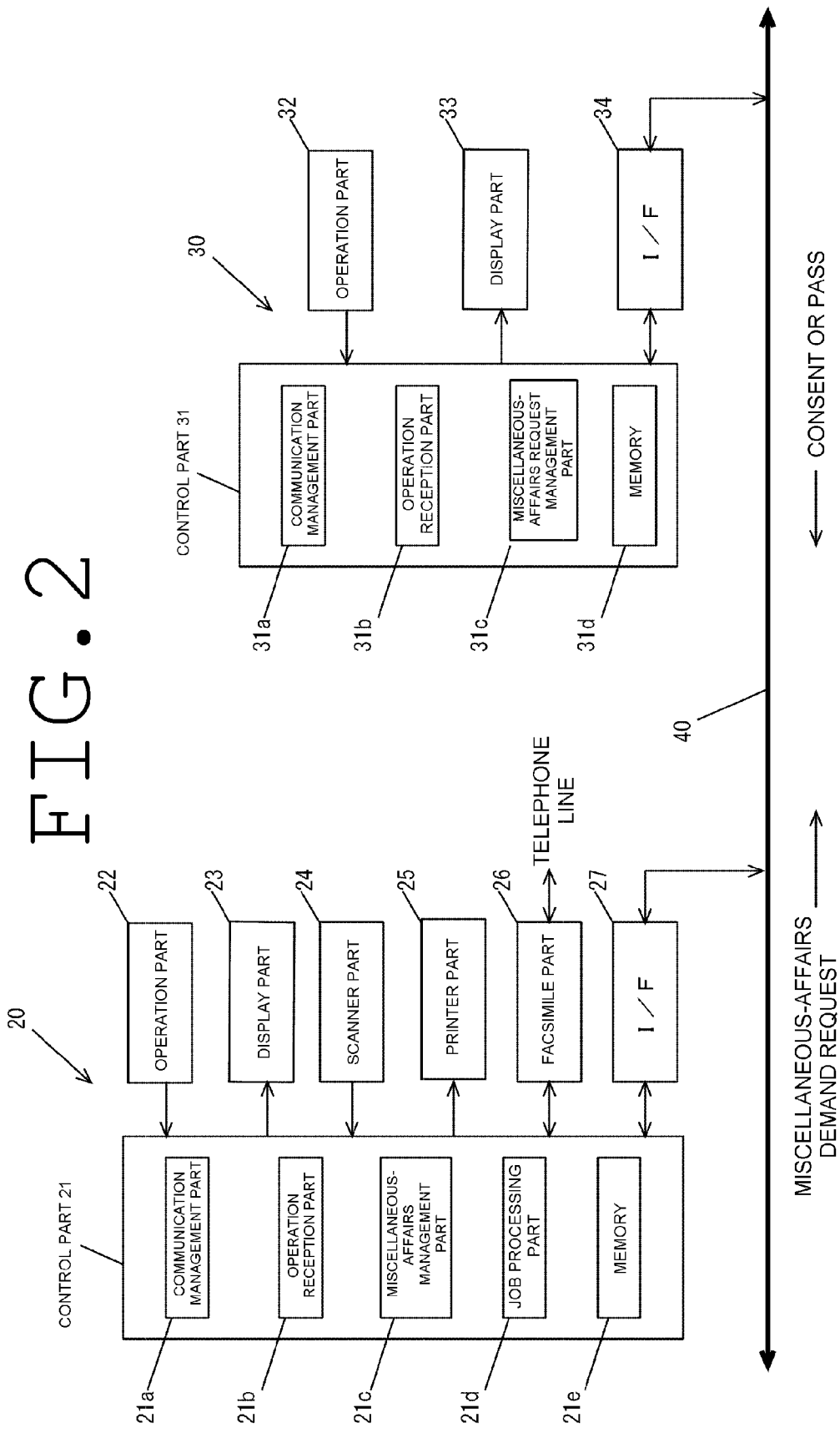

FIG. 3

(MISCELLANEOUS-AFFAIRS SUPPORTER LIST)

50

A — MISCELLANEOUS-AFFAIRS SUPPORTER

| NAME | DEPARTMENT NAME | ENTRANCE-INTO-A-COMPANY HISTORY | TERMINAL ADDRESS |
|---|---|---|---|
| Mr. A | ··· Dept. | 2 Years | * * * * * |
| Mr. B | ··· Dept. | 2 Years | * * * * * |
| Mr. C | ··· Dept. | 2 Years | * * * * * |
| Mr. D | ··· Dept. | 2 Years | * * * * * |
| Mr. E | ··· Dept. | 2 Years | * * * * * |
| ⋮ | ⋮ | ⋮ | ⋮ |

B — PRE-MISCELLANEOUS-AFFAIRS SUPPORTER

| Mr. F | ··· Dept. | 1 Year | * * * * * |
|---|---|---|---|
| Mr. G | ··· Dept. | 1 Year | * * * * * |
| Mr. H | ··· Dept. | 1 Year | * * * * * |
| Mr. I | ··· Dept. | 1 Year | * * * * * |
| Mr. J | ··· Dept. | 1 Year | * * * * * |
| ⋮ | ⋮ | ⋮ | ⋮ |

(ONE YEAR AFTER)

50

C — MISCELLANEOUS-AFFAIRS SUPPORTER

| NAME | DEPARTMENT NAME | ENTRANCE INTO A COMPANY HISTORY | TERMINAL ADDRESS |
|---|---|---|---|
| Mr. F | ··· Dept. | 2 Years | * * * * * |
| Mr. G | ··· Dept. | 2 Years | * * * * * |
| Mr. H | ··· Dept. | 2 Years | * * * * * |
| Mr. I | ··· Dept. | 2 Years | * * * * * |
| Mr. J | ··· Dept. | 2 Years | * * * * * |
| ⋮ | ⋮ | ⋮ | ⋮ |

D — PRE-MISCELLANEOUS-AFFAIRS SUPPORTER

| Mr. K | ··· Dept. | 1 Year | * * * * * |
|---|---|---|---|
| Mr. L | ··· Dept. | 1 Year | * * * * * |
| Mr. M | ··· Dept. | 1 Year | * * * * * |
| Mr. N | ··· Dept. | 1 Year | * * * * * |
| Mr. O | ··· Dept. | 1 Year | * * * * * |
| ⋮ | ⋮ | ⋮ | ⋮ |

IMAGE FORMING SYSTEM AND IMAGE FORMING APPARATUS THAT MAKE MISCELLANEOUS AFFAIRS ABOUT USE OF IMAGE FORMING APPARATUS SETTLE APPROPRIATELY

INCORPORATION BY REFERENCE

This application is based on and claims the benefit of priority from Japanese Patent Application No. 2014-080975 filed on Apr. 10, 2014, the contents of which are hereby incorporated by reference.

BACKGROUND

The present disclosure is related with an image forming system and an image forming apparatus that make miscellaneous affairs concerning use of the image forming apparatuses, such as an MFP (Multifunction Peripherals) and a printer, settle appropriately.

Generally, in a company or the like, an image forming apparatuses, such as an MFP and a printer, are shared via a network in many cases. For such the image forming apparatus, it is necessary to settle various miscellaneous affairs. For example, they are a maintenance work accompanying a paper jam or the like, replenishing work of expendable supplies, such as a paper and a toner, or the like.

However, in many cases, a person who takes charge of such miscellaneous affairs is not designated, specifically. Therefore, a noticed person often copes with the affair. In this case, it is predicted easily that there is a person who quickly handles it is difficult. For example, a person who is loaned to an objective company, or a person who has a short period after entering the company. This is because he or she is not used to the handling of the model. Also, not memorizing or grasping where the expendable supplies, such as a paper and a toner, are kept, or the like, is a reason.

In order to cope with such miscellaneous affairs, with a technology of a typical image processing apparatus, at the time of an error generation, a notices of collecting error release is transmitted all at once to a plurality of user terminals that satisfy specified conditions. Then, a notice of an operation request is transmitted to the user terminal that has the notice of an application first.

SUMMARY

An image forming system according to an embodiment of the present disclosure includes a client terminal and an image forming apparatus. The client terminal can be registered a print job to a print server. Printing that downloads the print job registered into the print server is possible for an image forming apparatus. The image forming apparatus has a memory circuit and a miscellaneous-affairs demand request circuit. The memory circuit stores a miscellaneous-affairs supporter list that registers a person concerning various miscellaneous affairs as a miscellaneous-affairs supporter. The miscellaneous-affairs demand request circuit performs a miscellaneous-affairs demand request to the client terminal of other person chosen from the miscellaneous-affairs supporter list if the request to the other person is needed in case of settling the various miscellaneous affairs. The client terminal has a miscellaneous-affairs demand response circuit. The miscellaneous-affairs demand response circuit responds to the miscellaneous-affairs demand request.

An image forming apparatus according to an embodiment of the present disclosure has a printing job circuit, a memory circuit, and a miscellaneous-affairs demand request circuit. The printing job circuit allows downloading and printing a print job registered into a print server. The memory circuit stores a miscellaneous-affairs supporter list that registers a person concerning various miscellaneous affairs as a miscellaneous-affairs supporter. The miscellaneous-affairs demand request circuit performs a miscellaneous-affairs demand request to a client terminal of other person chosen from the miscellaneous-affairs supporter list if the request to the other person is needed in case of settling the various miscellaneous affairs.

BRIEF DESCRIPTION OF THE DRAWINGS

FIG. 1 shows a configuration of an image forming system according to the embodiment of the present disclosure;

FIG. 2 shows a configuration of principal parts of a MFP and of a client terminal in FIG. 1;

FIG. 3 shows an example of a miscellaneous-affairs support list managed by the MFP in FIG. 1.

DETAILED DESCRIPTION

Figure 4:
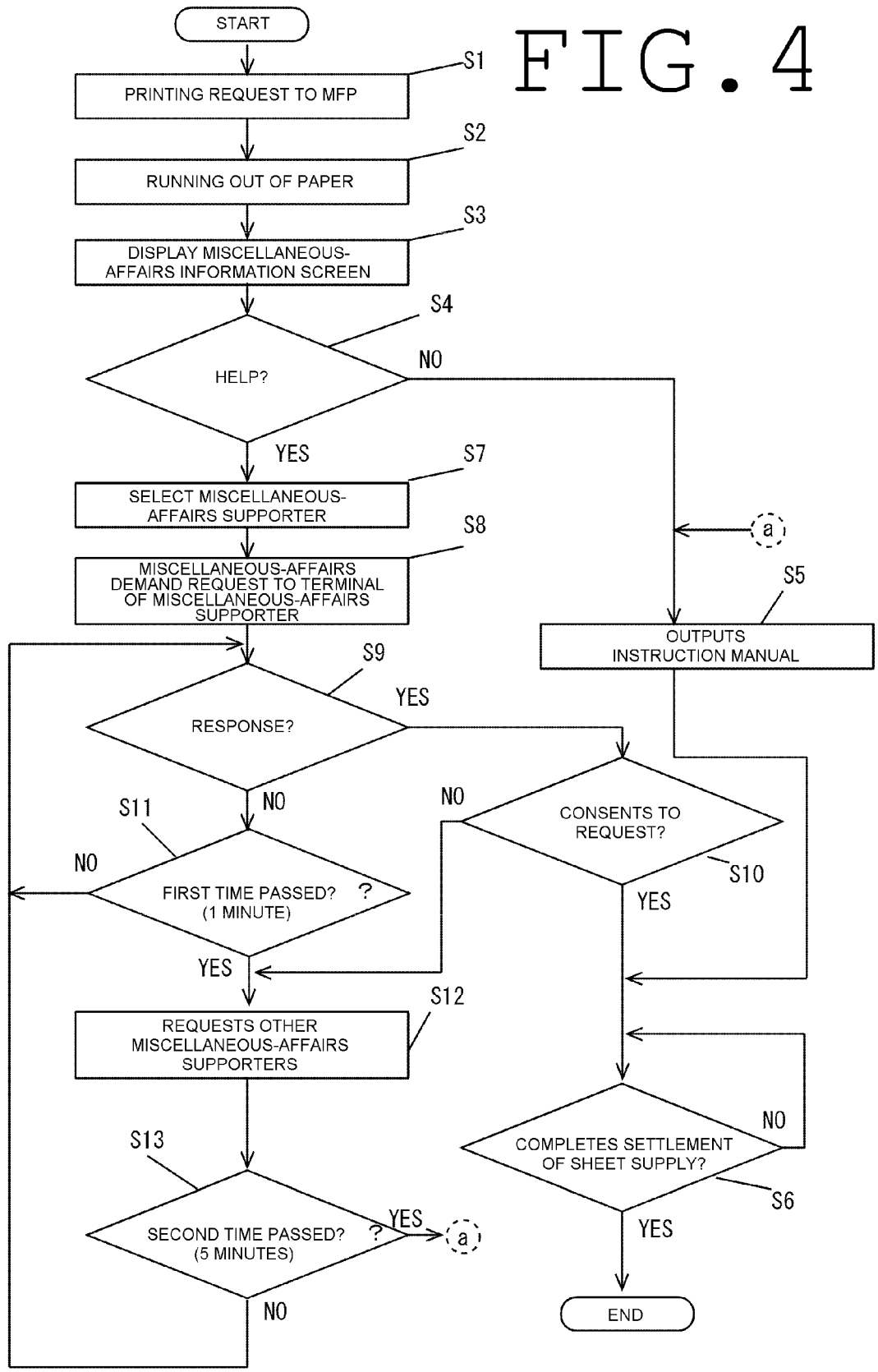
FIG. 4 shows steps of a miscellaneous-affairs processing by the image forming system in FIG. 1.

Hereinafter, one embodiment of the image forming system of the present disclosure is described, with referring to FIG. 1-FIG. 4. In addition, an example of the image forming apparatus in the following explanation is an MFP (Multifunction Peripheral.) The MFP is complex peripheral equipment that equips a plurality of functions, such as a printer function, a facsimile function, and a scanning function, for example.

First, as shown in FIG. 1, the image forming system includes print server 10, MFP 20, and client terminal 30. Client terminal 30 is a PC (personal computer,) or the like. Also, they are mutually connected via network 40. Various networks can be used for network 40.

Also, a print job is registered into print server 10 from client terminal 30. In that case, the print job registered into print server 10 is specified and downloaded, for example, by operation with a touch panel in the side of MFP 20. Thereby, it can be printed. The printing request is not limited by the operation with the touch panel of MFP 20. It can also be performed a similar printing request by a portable terminal.

Also, in such MFP 20, various miscellaneous affairs may need to be settled. The various miscellaneous affairs are, for example, a maintenance work accompanying a paper jam or the like, a replenishing work of expendable supplies, such as a paper and a toner, or the like. Here, for example, when a paper is run out, miscellaneous-affairs information screen 20*a* that tells the paper is run out is shown on the touch panel of MFP 20. Also, help button 20*b* and self button 20*c* are shown on miscellaneous-affairs information screen 20*a*. Help button 20*b* is operated in cases where it requests to another user. Self button 20*c* is operated in cases where it is coped with by himself or herself. The selection for either is urged. The operation in such button operation is described later.

Also, miscellaneous-affairs demand response screen 30*a* is shown on each client terminal 30. Also, consent button 30*b* and pass button 30*c* are shown on miscellaneous-affairs demand response screen 30*a*. Consent button 30*b* is operated if he or she agrees to settle the miscellaneous affair. Pass button 30*c* is operated if he or she does not agree to settle the miscellaneous affair. The selection for either is urged. The operation in such button operation is also described later.

Next, with reference to FIG. 2, a configuration of a principal part of MFP 20 and client terminal 30 is explained. First, MFP 20 has control part 21, operation part 22, display part 23, scanner part 24, printer part 25, facsimile part 26, and I/F (interface) 27. Control part 21 is a circuit that controls entire operation of MFP 20 based on a program in ROM that is not illustrated. Control part 21 has communication management part 21a, operation reception part 21b, miscellaneous-affairs management part 21c, job processing part 21d, and memory 21e.

Communication management part 21a is a circuit that receives a print job from print server 10 via I/F 27. The received print job is handed to job processing part 21d. Also, communication management part 21a notifies a miscellaneous-affairs demand request to client terminal 30, in cases where a various miscellaneous affair mentioned above is happened.

Operation reception part 21b is a circuit that accepts an operation of specifying the print job by operation part 22, an operation of help button 20b or self button 20c as mentioned above, or the like. Miscellaneous-affairs management part 21c is a circuit that shows miscellaneous-affairs information screen 20a on the touch panel of MFP 20, as mentioned above. This is carried out in cases where a paper jam or the like is happened and the maintenance work is needed, shortage of expendable supplies, such as a paper and a toner and the replenishing work or the like is needed. Also, miscellaneous-affairs management part 21c shows an instruction manual on the touch panel of MFP 20. This is performed when self button 20c is operated. Also, the instruction manual is stored in memory 21e as described later. Also, miscellaneous-affairs management part 21c chooses a miscellaneous-affairs supporter in miscellaneous-affairs supporter list 50, in cases where a various miscellaneous affair as mentioned above is happened. Then, miscellaneous-affairs management part 21c notifies a miscellaneous-affairs demand request to client terminal 30 of the selected miscellaneous-affairs supporter via communication management part 21a. Also, miscellaneous-affairs management part 21c manages miscellaneous-affairs supporter list 50 as indicated in after-mentioned FIG. 3. Management of miscellaneous-affairs supporter list 50 by miscellaneous-affairs management part 21c is described later.

Here, in the instruction manual stored in memory 21e, for example, the contents about the maintenance work accompanying the paper jam or the like are included. That is, about maintenance work, for example, contents that can be understood a process of maintenance easily by illustration or the like. Also, to the case where the replenishment work of expendable supplies, such as a paper and a toner, or the like are needed, for example, contents of "bringing and filling up the paper/toner put on the warehouse" are included. Also, about replenishment work, a figure indicating the place of the warehouse may be included.

In addition, the instruction manual shown on the touch panel of MFP 20 may show contents for management of all the miscellaneous affairs. Also, for example, in cases where a paper jam or the like is happened, only a content needed for management of the paper jam may be shown. Also, the instruction manual may be printed by printer part 25. Further, it may be shown on the screen of the portable terminal.

Job processing part 21d is a circuit that performs image processing (rasterize) to the print job downloaded from print server 10. Memory 21e is a circuit that stores the program needed for operation of miscellaneous-affairs management part 21c. Also, the print job downloaded from print server 10 is stored in memory 21e. Also, the instruction manual is stored in memory 21e. This instruction manual is read by miscellaneous-affairs management part 21c as mentioned above. Also, the miscellaneous-affairs supporter list 50 or the like as indicated in after-mentioned FIG. 3 is stored in memory 21e.

Operation part 22 is a circuit that is operated, incases where it specifies the print job registered into print server 10, or in cases where it chooses help button 20b or self button 20c in miscellaneous-affairs information screen 20a as mentioned above. Operation part 22 is configured as a touch panel, for example. Furthermore, in the image forming system, since to keep utilization right of a user, a login process is performed. This login process is performed via operation part 22, or it is carried out via the IC card reader that is not illustrated. Display part 23 is a circuit that displays specification of a print job, a message that guides login or the like, a list of print jobs that a user can print, miscellaneous-affairs information screen 20a, an instruction manual, or the like.

Scanner part 24 is a circuit that inputs the image data of the manuscript read by an image sensor (not shown) into control part 21 (memory 21e.) That is, scanner part 24 converts the image signal of the manuscript from the image sensor (not shown) into digital image data and then input into control part 21, sequentially.

Printer part 25 is a circuit that prints an image on a paper based on the image data output from control part 21.

Facsimile part 26 is a circuit that transmits the image data output from control part 21 to a facsimile that serves as the other party via a telephone line. Also, facsimile part 26 receives the image data from another party facsimile and inputs it into control part 21. That is, facsimile part 26 compresses and modulates the image data output from control part 21 with controlling connection with a telephone line. Then, facsimile part 26 transmits it to the other party facsimile. Also, facsimile part 26 demodulates and decompresses the image data from the other party facsimile with connecting the telephone line. Then, facsimile part 26 is input it into control part 21. I/F 27 is a circuit of interface that is connected to network 40. I/F 27 transmits and receives data between client terminal 30 and MFP 20 as mentioned above.

In addition, in a job of a copy function, image data is input from scanner part 24 to memory 21e. Then, image data is output from memory 21e to printer part 25. In a job of a print function, the image data rasterized by job processing part 21d is output to printer part 25. In a job of a scanner function, image data is input from scanner part 24 to memory 21e. Then, image data is output from memory 21e to I/F 27.

In a job of a fax transmission function, image data is input to memory 21e from scanner part 24 (or I/F 27). Then, image data is output to facsimile part 26 from memory 21e. In a job of a fax receiving function, image data is input from facsimile part 26 to memory 21e. Then, image data is output from memory 21e to printer part 25.

Also, in cases where the print job registered into print server 10 is printed from MFP 20, as mentioned above, the login process is performed for confirming utilization right for the user from operation part 22, or the like. In that case, user authentication information is transmitted to print server 10 via network 40.

Also, when the user authentication is performed on the side of print server 10, the list of the print jobs that the user can print on the side of MFP 20 is acquired, and it is displayed on display part 23. Then, the user operates operation part 22 and chooses the job to print. In that case, the specified print job is downloads from print server 10 and is stored in memory 21e. As for the print job stored in memory 21e, PDL data are rasterized. In this case, it is rasterized by job processing part 21d according to setting data, which shows a print setting included in a print job. Then, based on the rasterized image data, an image is printed on a paper.

On the other hand, client terminal 30 includes control part 31, operation part 32, display part 33, and I/F (interface) 34. Control part 31 is a circuit that controls operation of the entire client terminal 30 based on a program in ROM that is not illustrated. Control part 31 has communication management part 31a, operation reception part 31b, miscellaneous-affairs request management part 31c, and memory 31d.

Communication management part 31a is a circuit that registers the print job to print server 10 via I/F 34. Also, communication management part 31a receives the miscellaneous-affairs demand request from the side of MFP 20. The received miscellaneous-affairs demand request is handed to miscellaneous-affairs request management part 31c. Also, communication management part 31a transmits the contents according to the operation of consent button 30b or pass button 30c on miscellaneous-affairs demand response screen 30a as mentioned above to MFP 20.

Operation reception part 31b is a circuit that accepts the operation of consent button 30b or pass button 30c by operation part 32, or the like. Miscellaneous-affairs request management part 31c is a circuit that shows miscellaneous-affairs demand response screen 30a when there is a miscellaneous-affairs demand request from the side of MFP 20. Memory 31d is a circuit that stores a program needed for operation of miscellaneous-affairs request management part 31c or the like.

Operation part 32 is a circuit that is operated when choosing consent button 30b or pass button 30c on miscellaneous-affairs demand response screen 30a, for example. Operation part 32 is configured as a keyboard, for example. Display part 33 is a circuit that displays various types of information, for example, miscellaneous-affairs demand response screen 30a. I/F 34 is a circuit of interface that is connected to network 40. I/F 34 transmits and receives the data, for example, between print server 10 and MFP 20, as mentioned above.

Next, with reference to FIG. 3, miscellaneous-affairs supporter list 50 managed by miscellaneous-affairs management part 21c in MFP 20 is explained. Miscellaneous-affairs supporter list 50 as shown in FIG. 3 indicates a case where entrance-into-a-company histories are the first year and the second year for convenience of explanation.

First, as advance preparations, an exclusive-use-program needed for management or the like for the miscellaneous affairs as mentioned above is installed in MFP 20 and client terminal 30 or the like. Then, the program is started on the side of MFP 20, and a person in the company who has a possibility to settle the miscellaneous affairs mentioned above is registered. When registering, it may carry out by an operation of the touch panel on MFP 20, or it may perform by an operation on the side of client terminal 30. Also, to the person who has possibility to settle the miscellaneous affairs, it has been already explained about handling of MFP 20, a storage place of expendable supplies, such as a paper and a toner, or the like.

Here, as shown in FIG. 3B, a person to be registered firstly becomes a pre-miscellaneous-affairs supporter. For example, in FIG. 3B, Mr. F-Mr. J and others are registered. The entrance-into-a-company history for these people, Mr. F-Mr. J and others, are the first year. Thus, each of the people for the first year is registered in the entrance-into-a-company history. Also, for example, after passing for one year, as shown in FIG. 3C, they are automatically advance to miscellaneous-affairs supporters by miscellaneous-affairs management part 21c which mentioned above.

In addition, Mr. A-Mr. E and others, as shown in FIG. 3A, are the people registered as the pre-miscellaneous-affairs supporters one year ago. Also, Mr. K-Mr. O and others, as shown in FIG. 3D, are the people newly registered as pre-miscellaneous-affairs supporters. Thus, the person for the first year is registered in the entrance-into-a-company history as the pre-miscellaneous-affairs supporter. In that case, after this, whenever it passes in one year, sequentially, it is advanced as the miscellaneous-affairs supporter by miscellaneous-affairs management part 21c. In addition, an order of row for the people shown FIG. 3 A-D, for example, may be in the order of the name. Also, it may be the order of age.

Also, in case of registration of a person, the address of the terminal that the each person uses is registered. The terminal may be client terminal 30 as mentioned above. Also, it may be a portable terminal that each person has.

Next, with reference to FIG. 4, a miscellaneous-affairs processing by the image forming system is explained. In addition, the miscellaneous affair explained in the following is related with, for example, replenishment work when it happens a running-out of paper. At first, on the side of MFP 20, after the login process is performed in order to keep utilization right for the user, a printing request is performed by operation of the touch panel of MFP 20, for example (Step S1). Here, an example of happening a running-out of paper is explained (Step S2). Miscellaneous-affairs management part 21c shows miscellaneous-affairs information screen 20a that tells running-out the paper on the touch panel of MFP 20, for example (Step S3).

As mentioned above, help button 20b and self button 20c are displayed on miscellaneous-affairs information screen 20a. The user can operate help button 20b, in case of being not able to settle it by himself or herself. The user can operate self button 20c, in case of being able to settle it by himself or herself. Here, when self button 20c is operated (Step S4: NO), miscellaneous-affairs management part 21c outputs the instruction manual (Step S5). In this case, the instruction manual is shown on the touch panel of MFP 20, for example.

Also, for example, the instruction manuals shown on the touch panel of MFP 20 may have the contents for settling all the miscellaneous affairs. However, for user convenience, for example, it may only be a content that "the paper/toner put on the warehouse are brought and filled up." Then, it becomes a waiting state for managing the sheet supply (Step S6: NO). When the sheet supply is accomplished, miscellaneous-affairs management part 21c determines that the management is completed (Step S6: YES).

On the other hand, the case where help button 20b is operated in Step S4 is explained (Step S4: YES). Miscellaneous-affairs management part 21c chooses a person registered as a miscellaneous-affairs supporter, who is equal or more than second year in miscellaneous-affairs supporter list 50, as mentioned above (Step S7). In addition, when choosing a person, it may be the order of a row of the st. Also, a person may be chosen at random. As random, it decreases selecting the same person, and the burden of the miscellaneous affairs will not be concentrated.

When the person is chosen, communication management part 21a notifies a miscellaneous-affairs demand request to client terminal 30 or the portable terminal, which is the terminal for the person (Step S8). For example, miscellaneous-affairs request management part 31c of client terminal 30, which the miscellaneous-affairs demand request is received, displays miscellaneous-affairs demand response screen 30a as mentioned above. Here, in MFP 20, it becomes response waiting from client terminal 30. If there is a response from client terminal 30 (Step S9: YES), it is determined whether or not it has consented to the request (Step S10). That is, if there is a response about consent button 30b of miscellaneous-affairs demand response screen 30a being operated, it is determined to be consented (Step S10: YES). In this case, it proceeds to Step S6, the completion of management is determined by miscellaneous-affairs management part 21c.

On the other hand, if there is a response of pass button 30c being operated, it is determined not to be consented to the request (Step S10: NO). In that case, communication management part 21a performs a request to another miscellaneous-affairs supporter (Step S12). Also in this case, as similar to the above, a miscellaneous-affairs demand request is issued by client terminal 30 or the portable terminal, which is the terminal of the person. In addition, for a selection of another miscellaneous-affairs supporter, it may be the order of a row of the list as like the above. Also, random selection may be sufficient.

Also, in Step S9, if there is no response, it is served as waiting for progress of the first time (Step S11: NO). In addition, for example, the first time here is one minute. However, this first time is not limited in one minute. That is, it may be shorter than after-mentioned second time (for example, 5 minutes).

Then, the first time (for example, one minute) passes (Step S11: YES). In that case, it proceeds to Step S12, and communication management part 21a performs the request to other miscellaneous-affairs supporters as like the above. Here, it is determined whether or not the second time (for example, 5 minutes) passes (Step S13). However, when the request to the other miscellaneous-affairs supporter is performed at the first time, the second time (for example, 5 minutes) has not been passed (Step S13: NO). In this case, it proceeds to Step S9 and becomes a response waiting from other miscellaneous-affairs supporters. Here, although the second time is explained as 5 minutes, of course, it is not limited in 5 minutes. That is, it may be longer than the first time (for example, one minute). However, when the second time is long too much, the user who has the printing demand by MFP 20 will be kept waiting for a long time. Therefore, time, which is supposed that the user can wait, may be set up.

Then, when there is a response from the other miscellaneous-affairs supporter in Step S9 and it is consented to the request in Step S10, miscellaneous-affairs management part 21c proceeds to Step S6. That is, miscellaneous-affairs management part 21c determines completing to settle it. Thus, it waits for a response from a miscellaneous-affairs supporter; and if it does not consent to the request, it waits for the response from the following other miscellaneous-affairs supporters, sequentially. In this case, if there is no consent of the request from the following miscellaneous-affairs supporter and the second time (for example, 5 minutes) passes (Step S13: YES), miscellaneous-affairs management part 21c proceeds to Step S5. In this case, miscellaneous-affairs management part 21c outputs the instruction manual.

Thus, in the present embodiment, miscellaneous-affairs management part 21c, which is a miscellaneous-affairs demand request part, in MFP 20, which is an image forming apparatus, performs coping with various miscellaneous affairs. In this case, if a request to other person is needed, a person is chosen from miscellaneous-affairs supporter list 50 stored in memory 21e, which is a memory part. Then, the miscellaneous-affairs demand request to a client terminal 30 of the selected person is performed. In that case, a response to the miscellaneous-affairs demand request from miscellaneous-affairs request management part 31c, which is a miscellaneous-affairs demand response part in client terminal 30, is obtained.

Specifically, miscellaneous-affairs information screen 20a that miscellaneous-affairs management part 21c in MFP 20 urges to coping with various miscellaneous affairs is output. Then, the miscellaneous-affairs demand request by an instruction of a request to other person via miscellaneous-affairs information screen 20a is notified to client terminal 30. Next, miscellaneous-affairs demand response screen 30a to which miscellaneous-affairs request management part 31c of client terminal 30 urges the response to a miscellaneous-affairs demand request is output. Then, when consent is instructed via miscellaneous-affairs demand response screen 30a, a response that indicates consent is performed to MFP 20.

Here, the person registered into miscellaneous-affairs supporter list 50 is given to explanation, as mentioned above, the handling of MFP 20, the storage place of expendable supplies, such as a paper and a toner, or the like. Therefore, coping with various miscellaneous affairs is possible. That is, the miscellaneous-affairs demand request to the person registered into miscellaneous-affairs supporter list 50 is performed. Thereby, even if the handling of MFP 20 or the storage place of expendable supplies such as a paper and a toner or the like is unknown, operations to various miscellaneous affairs can be completed appropriately and certainly.

Also, in the present embodiment, the instruction manual to the various miscellaneous affairs is stored in memory 21e. Thereby, an instruction manual is output by miscellaneous-affairs management part 21c if the consent from the other person is not obtained. Therefore, even if the handling of MFP 20 or the storage place of expendable supplies such as a paper and a toner or the like is unknown, it can perform confirmation of the instruction manual. Therefore, it becomes possible to make the operations to the various miscellaneous affairs complete appropriately and certainly.

Also, in the present embodiment, it has the first time (for example, 1 minute) and the second time (for example, 5 minutes) about decision of miscellaneous-affairs management part 21c. Miscellaneous-affairs management part 21c, in the first time, determines the existence of the response from client terminal 30 of the other person. Miscellaneous-affairs management part 21c, in the second time, determines whether or not a miscellaneous-affairs demand request is performed to client terminal 30 of the following other person. If there is no response from client terminal 30 of the other person even if the time of first passes, the following other person is chosen from the miscellaneous-affairs supporter list, sequentially, and a miscellaneous-affairs demand request is performed. If there is no response to the miscellaneous-affairs demand request when the second time passes, the instruction manual is output. Therefore, it becomes unnecessary to wait the response from the other person for long time.

Also, in the present embodiment, by miscellaneous-affairs management part 21c, a person to be registered into miscellaneous-affairs supporter list 50 firstly is considered as a pre-miscellaneous-affairs supporter. Then, when a specific year (for example, one year) passes, he or she will advance to a miscellaneous-affairs supporter. Therefore, the person who can make the operations to miscellaneous affairs complete appropriately and certainly can be chosen from miscellaneous-affairs supporter list 50.

As explained in detail, in a typical image processing apparatus, a notice of an operation request is transmitted to a user terminal that has the notice of the application first to the notice of an error release collection.

However, in the user who satisfies this specified condition, the user who transmits image processing jobs, the user who transmitted the processed image processing jobs from which the processing result is not received are included. Therefore, if there is the notice of the application from a user who is unfamiliar to the error releasing work, first, the notice of the application from the user who is familiar to the error releasing work is no longer accepted.

In this case, some unfamiliar users may be unable to perform error releasing work certainly. Thus, when error releasing work is not performed certainly, the notice of error release collection must be transmitted again. Therefore, error releasing work may not be completed appropriately and certainly.

As compared with this, according to the image forming system in the present disclosure, if the request to other person is needed in case of settling various miscellaneous affairs, a miscellaneous-affairs demand request is performed to a client terminal of a person chosen from the miscellaneous-affairs supporter list. The miscellaneous-affairs supporter list is stored in the memory part. Therefore, the operations to various miscellaneous affairs can be completed appropriately and certainly.

In addition, in the present embodiment, as the miscellaneous-affairs demand from MFP 20 to client terminal 30, the cases that the maintenance work accompanying a paper jam or the like, and the replenishment work of expendable supplies, such as a paper and a toner, are explained. However, it is not limited to the above examples. Miscellaneous-affairs demands may be performed, for example, various miscellaneous affairs, such as moving work accompanying layout modification or the like, distribution operations of the printed materials, or the like.

In this case, for example, the selection items about various miscellaneous affairs are shown on the touch panel in MFP 20, one of the items is chosen. In response to this, a miscellaneous-affairs supporter is chosen as like the above. Then, the miscellaneous-affairs demand of moving work, distribution operations, or the like, as mentioned above, is send to client terminal 30 of the selected miscellaneous-affairs supporter.

Also, in the present embodiment, the case that the image processing apparatus is MFP 20 is explained. However, it is not limited to this example. For example, it may be a case that the image processing apparatus is a printer.

What is claimed is:

1. An image forming system comprising:
   a client terminal that can register a print job to a print server;
   an image forming apparatus that allows to download and print the print job registered to the print server; and
   the image forming apparatus has
   a memory circuit that stores a miscellaneous-affairs supporter list to register a person concerning various miscellaneous affairs as a miscellaneous-affairs supporter,
   a miscellaneous-affairs demand request circuit that performs a miscellaneous-affairs demand request to the client terminal of other person chosen from the miscellaneous-affairs supporter list if the request to the other person is needed in case of settling the various miscellaneous affairs; and
   the client terminal includes a miscellaneous-affairs demand response circuit that responds to the miscellaneous-affairs demand request.

2. The image forming system according to claim 1, wherein the miscellaneous-affairs demand request circuit outputs a miscellaneous-affairs information screen urged to settle the various miscellaneous affairs;
   the miscellaneous-affairs demand response circuit outputs a miscellaneous-affairs demand response screen that the response is urged according to the miscellaneous-affairs demand request;
   the miscellaneous-affairs demand request circuit, when a request to the other person is instructed via the miscellaneous-affairs information screen, notifies the miscellaneous-affairs demand request to the client terminal; and
   the miscellaneous-affairs demand response circuit, when consent is instructed via the miscellaneous-affairs demand response screen, performs a response that indicates consent to the image forming apparatus.

3. The image forming system according to claim 2, wherein in the memory circuit, an instruction manual to the various miscellaneous affairs is stored; and
   the miscellaneous-affairs demand request circuit outputs the instruction manual if the consent from the other person is not obtained.

4. The image forming system according to claim 3, wherein the miscellaneous-affairs demand request circuit, when not requesting to the other person via the miscellaneous-affairs information screen is instructed, outputs the instruction manual.

5. The image forming system according to claim 2, wherein the miscellaneous-affairs demand request circuit has
   a first time that determines an existence of the response from the client terminal of the other person,
   a second time that determine whether or not performs the miscellaneous-affairs demand request to a client terminal of a following other person;
   if there is no response from the client terminal of the other person after passing the first time, the following other person is chosen sequentially from the miscellaneous-affairs supporter list, and the miscellaneous-affairs demand request is performed; and
   if there is no response to the miscellaneous-affairs demand request after passing the second time, the instruction manual is output.

6. The image forming system according to claim 1, wherein the miscellaneous-affairs demand request circuit selects a person to be registered into the miscellaneous-affairs supporter list at a first time as a pre miscellaneous-affairs supporter, and when a specific year pass, advances to the miscellaneous-affairs supporter.

7. An image forming apparatus comprising:
   a printing job circuit that allows to download and print a print job registered to a print server;
   a memory circuit that stores a miscellaneous-affairs supporter list to register a person concerning various miscellaneous affairs as a miscellaneous-affairs supporter; and
   a miscellaneous-affairs demand request circuit that performs a miscellaneous-affairs demand request to a client terminal of a person chosen from the miscellaneous-affairs supporter list if the request to other person is needed in case of settling the various miscellaneous affairs.

* * * * *